(12) United States Patent
Saikkonen et al.

(10) Patent No.: US 9,422,724 B2
(45) Date of Patent: Aug. 23, 2016

(54) SEAL FOR A PIPE PENETRATION IN A ROOF UNDERLAY

(71) Applicant: SK TUOTE OY, Mustassari (FI)

(72) Inventors: Eero Saikkonen, Vaasa (FI); Pasi Puikkonen, Mustasaari (FI)

(73) Assignee: SK TUOTE OY, Mustasaari (FI)

( * ) Notice: Subject to any disclaimer, the term of this patent is extended or adjusted under 35 U.S.C. 154(b) by 0 days.

(21) Appl. No.: 14/767,334

(22) PCT Filed: Feb. 12, 2014

(86) PCT No.: PCT/FI2014/050107
§ 371 (c)(1),
(2) Date: Aug. 12, 2015

(87) PCT Pub. No.: WO2014/125169
PCT Pub. Date: Aug. 21, 2014

(65) Prior Publication Data
US 2015/0368907 A1    Dec. 24, 2015

(30) Foreign Application Priority Data

Feb. 13, 2013 (FI) .................................... 20135132
Oct. 28, 2013 (FI) .................................... 20136052

(51) Int. Cl.
*E04D 1/30* (2006.01)
*E04D 13/16* (2006.01)
(Continued)

(52) U.S. Cl.
CPC ............ *E04D 13/16* (2013.01); *E04D 13/1476* (2013.01); *F16J 15/02* (2013.01)

(58) Field of Classification Search
CPC ... E04D 13/14; E04D 13/147; E04D 13/1473; E04D 13/1475; E04D 13/1476; F16J 15/02; F16J 15/021; F16J 15/022
See application file for complete search history.

(56) References Cited

U.S. PATENT DOCUMENTS

| 2008/0098673 A1* | 5/2008 | Johnston | E04D 13/1476 52/198 |
| 2010/0109318 A1* | 5/2010 | Mulligan | E04D 13/0409 285/42 |
| 2011/0000154 A1* | 1/2011 | Cline | E04D 13/1476 52/219 |

(Continued)

FOREIGN PATENT DOCUMENTS

| DE | 4430657 A1 | 3/1996 |
| DE | 29800679 U1 | 7/1998 |

(Continued)

OTHER PUBLICATIONS

RT L-35877. Visux-Hoyryn—JA Ilmansulun Lapiviennit Visux—Aluskatteen Lapiviennit. Nov. 2001. Obtainable from the internet: http://www.visux.com—RT-Kortti—Visux-putken RT—kortti RT L-35877 [retrieved May 13, 2014] entire document, specifically pp. 1 and 4.

(Continued)

*Primary Examiner* — Gilbert Lee
(74) *Attorney, Agent, or Firm* — Young & Thompson

(57) ABSTRACT

A roof underlay seal (1) for a leadthrough penetrating a roof structure, includes a tubular collar (2) and a flange portion (3) laterally extending from the collar and surrounding it. The collar (2) is attached to a flange portion (3) via a flexible sleeve (4) extending between the collar (2) and the flange portion (3) for setting the upper end of the collar (2) flexibly at a desired distance from the flange portion (3).

20 Claims, 5 Drawing Sheets

(51) Int. Cl.
*F16J 15/02* (2006.01)
*E04D 13/147* (2006.01)

(56) References Cited

U.S. PATENT DOCUMENTS

| | | | | |
|---|---|---|---|---|
| 2013/0307259 | A1* | 11/2013 | Rodriguez, Jr. | E04D 13/147 285/44 |
| 2013/0328300 | A1* | 12/2013 | Bond | B26D 3/00 285/42 |

FOREIGN PATENT DOCUMENTS

| | | |
|---|---|---|
| DE | 102004025565 A1 | 2/2005 |
| EP | 1847662 A2 | 10/2007 |
| EP | 2246622 A2 | 11/2010 |
| FI | 87250 B | 8/1992 |
| FI | 113291 B | 8/1995 |
| FI | 121021 B | 6/2010 |
| GB | 2224090 A | 4/1990 |
| WO | 9528537 A1 | 10/1995 |

OTHER PUBLICATIONS

FI Search Report, dated May 23, 2014, from corresponding FI 20136052 application.
FI Search Report, dated Nov. 27, 2013, from corresponding FI20135132 application.
International Search Report, dated May 15, 2014, from corresponding PCT application.

* cited by examiner

SEAL FOR A PIPE PENETRATION IN A ROOF UNDERLAY

FIELD OF THE INVENTION

The invention relates to a seal for a pipe penetration in an underlay of a weatherproofing roof covering.

STATE OF THE ART

A problem that occurred in prior art roofing underlay seals is that they did not seal against a pipe extending through the weatherproofing roof covering, or correspondingly against the undersurface of the roof covering penetration flashing. In demanding weather conditions, as in strong winds, snow or water could penetrate the roof underlay and soak the structures beneath the underlay.

Conventionally, the roof covering is made from mechanically joined sheet metal, metal sheet profiles or tiles manufactured from concrete or clay. These roof coverings resist water in light rain showers, but especially in the case of tiled roofs, strong winds may force rainwater or snow through the slits in the roof into the space below. For this reason, roof covering is usually provided with an underlay beneath the weatherproofing layer proper for preventing water or melted snow from entering the structures below.

As vertical piping often extends through the roof structure, the access of water through an opening made in the roofing underlay must be prevented. For example according to Finnish patent No. 87250 this is carried out using a penetration seal which is fastened to the roofing battens from below the roofing underlay. The relevant penetration seal comprises a flange part and a collar extending upwards from the flange. As the collar part rises above the plane of the underlay, it prevents water flowing along the underlay to penetrate the opening in the seal. The flange part, again, is sealed to the lower surface of the underlay by a suitable adhesive or sealing compound. In addition, the seal elevates the underlay at the site of the opening in order to prevent the formation of a depression in which stagnant water could accumulate.

The above described underlay seal, however, does not seal against the penetration flashing attached to the weatherproofing roof covering. Thus, water or snow blown into the space between the roof covering and the underlay by the wind may move into the structures beneath the underlay through the slit between the pipe and the collar part. Since pipes extending through the roof shall often be isolated up to the roof covering, it is more recommendable to seal the underlay rather to the penetration flashing for the roof covering than to the penetrating pipe.

The sealing of the underlay to the inner surface of the penetration flashing for the weatherproofing covering is hampered by the varying distance between the underlay and the weatherproofing covering. The underlay can be separated from the covering by e.g. 20 to 100 mm depending on the distance between roof trusses, which may be e.g. 600-900-1200 mm. The distance between underlay and covering is dependent on the thickness of the battens, which increases with the distance between trusses. For example, with a 900 mm truss distance, 50 mm (50×50 mm) battens are used. Also the pitch of the roof gives rise to distinct issues in the design of underlay seals, since a seal fitted to an inclined underlay must adapt to a vertical pipe penetration. Thus, the greater the pitch of the roof, the more an underlay seal must be able to stretch.

OBJECTIVES AND SUMMARY OF THE INVENTION

To solve the abovementioned problems, a roof underlay penetration seal has been developed, characterized in that the collar of the seal is attached to the flange part with a flexible sleeve extending between the collar and the flange part. Using the design according to the invention, the upper end of the collar can be flexibly set at the desired distance from the flange portion for attaching the seal to the penetration flashing.

The sleeve between the collar and the flange part can be constructed for example with undulating folds extending in the direction of the flange part. Alternatively, the sleeve can be constructed using for example at least one fold extending from the collar, particularly when the flange part surrounds a tube-shaped collar between the upper and lower ends of the collar.

For fixing to the penetration flashing fitting, self-adhesive material can be provided at the upper end of the seal collar. The fastening can be accomplished also by providing stretching bands extending from the collar upper end, which bands can be used for pulling the collar upper end against the penetration flashing.

The area of the collar upper end can also be provided with a stiffener. In this manner, the shape integrity of the collar upper end can be secured as it is stretched into contact with the penetration flashing. The stiffener can be, for example, molded to the collar. In the alternative, the stiffener can be a separate part. In this case, the stiffener is preferably provided with openings or perforated tongues adapted for receiving the stretching bands extending from the collar upper end as these bands are treaded through for fixing the stiffener in the proper location.

The underlay seal according to the invention can be tightly attached to the roof covering penetration flashing, whereby water or snow blown by the wind into the space between the roof covering and the underlay cannot reach the structures beneath the underlay. In addition, the underlay seal according to the invention can be used with various batten thicknesses and roof pitches. Further, due to the seal according to the invention, a pipe penetrating the roof covering structure can easily be isolated under the roof up to the weatherproofing covering.

BRIEF DESCRIPTION OF THE FIGURES

In the following, the invention is described in greater detail with reference to the attached drawing, in which.

DETAILED DISCLOSURE OF THE INVENTION

When reference is made to the underlay seal 1, in particular its collar 2, in the following the term "lower end" is used to denote the end facing the underlay when the seal is fitted in the conventional manner. Correspondingly, the term "upper end" is used to denote the end facing the weatherproofing roof covering.

Figure 1A:
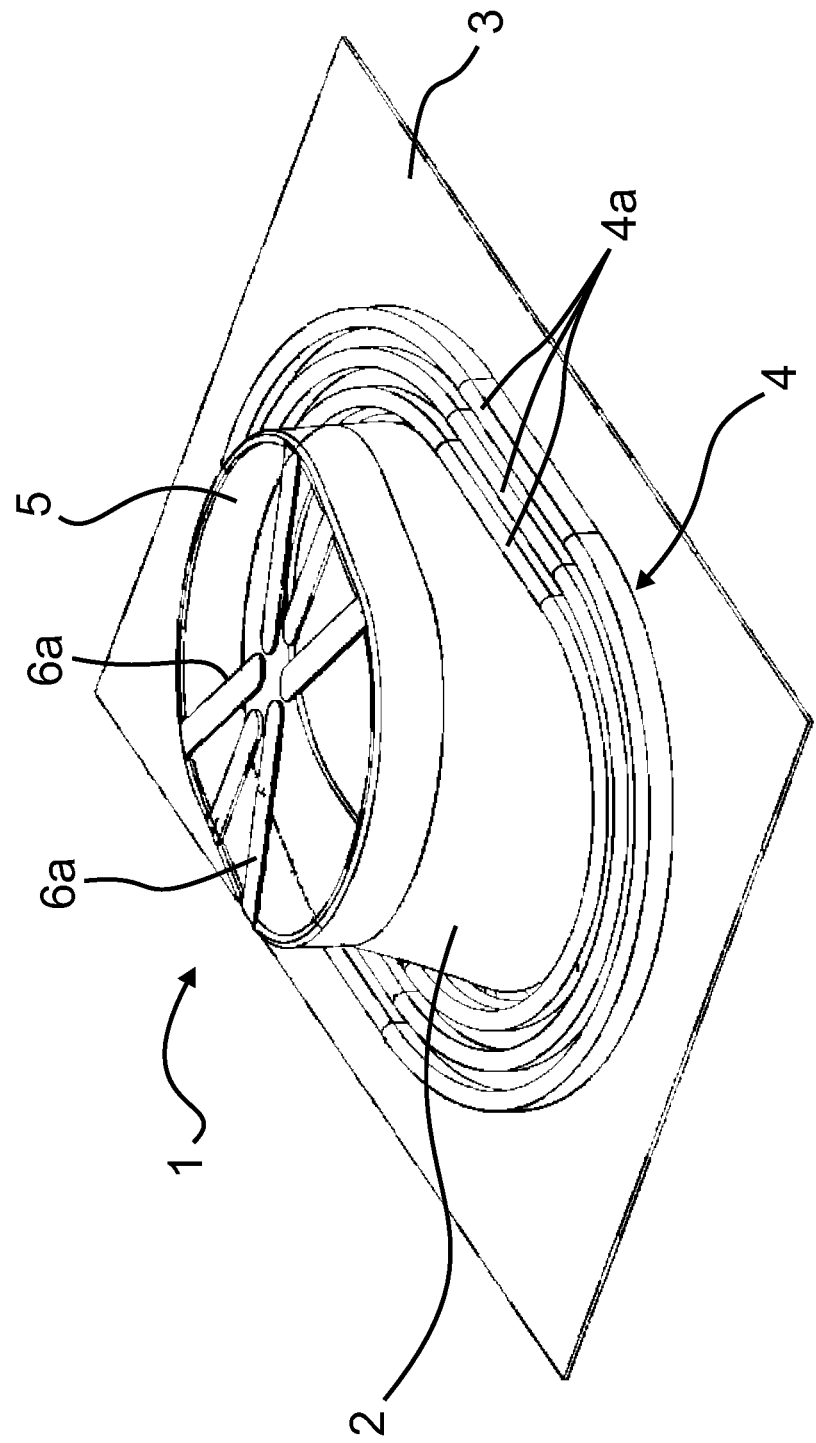
FIG. 1A shows a perspective view of an example of an embodiment of an underlay seal according to the present invention.

FIG. 1A shows an underlay seal 1 according to an embodiment of the invention, having a collar 2 and a flange portion 3. The collar 2 and the flange portion 3 are connected by means of a sleeve 4, comprising folds 4a. At the upper end of collar 2 is provided an annular stiffener 5. Further, from the upper end of collar 2 extend bands 6a which are perforated at their ends.

Figure 1B:
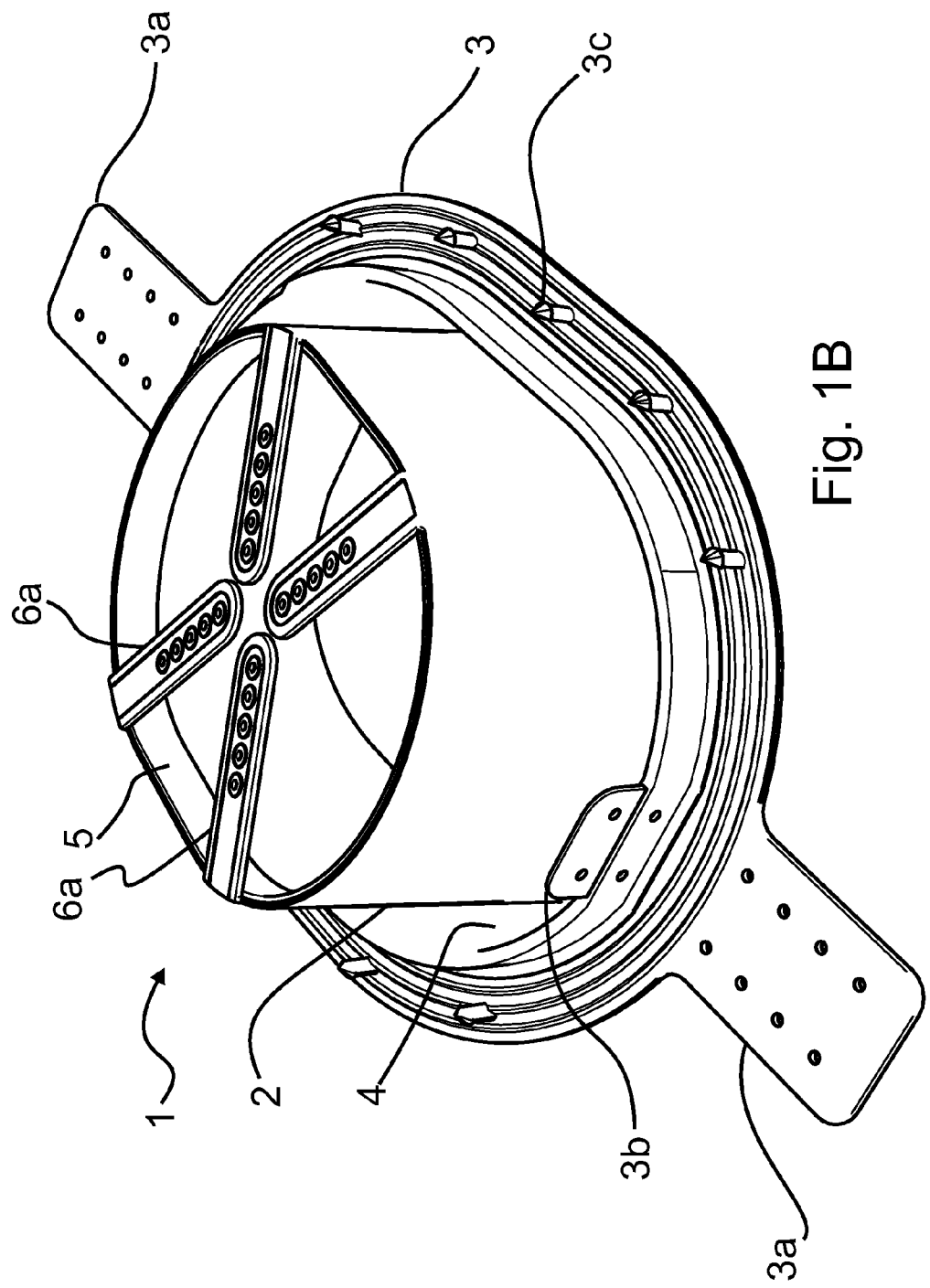
FIG. 1B shows a perspective view of a further example of an embodiment of an underlay seal according to the present invention.

FIG. 1B shows an underlay seal 1 according to another embodiment of the invention, also having a collar 2 and a flange portion 3. Fastening plates 3a, 3b are provided in the flange portion for fastening seal 1 to the battens. Further, prongs 3c extend upwards from the flange portion, whereby the seal 1 can be fastened to the underlay by pushing these prongs through the underlay. The collar 2 extends below the flange portion 3, and sleeve 4 folds back up connecting collar 2 to flange portion 3. An annular stiffener 5 is provided at the upper end of collar 2. In addition, bands 6a perforated at their ends extend from the upper end of collar 2.

Figure 2:
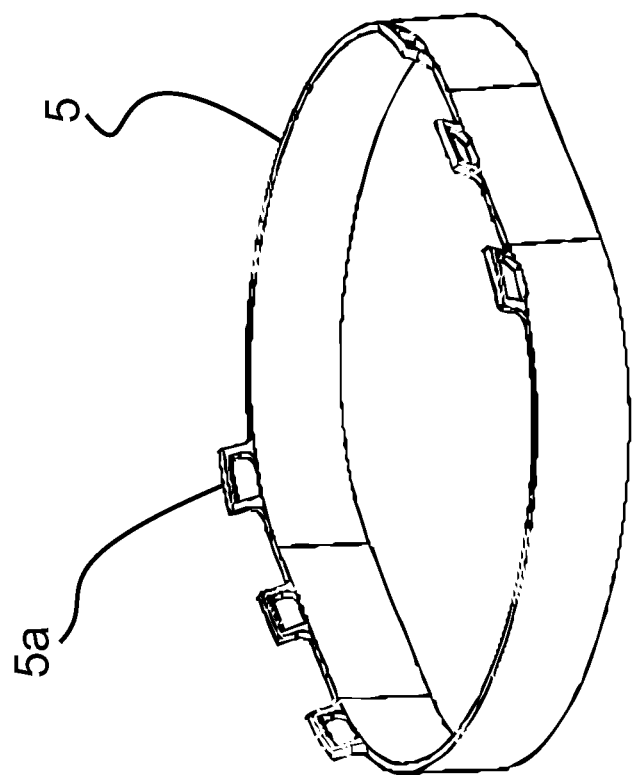
FIG. 2 shows an example of a stiffener to be fitted at the upper end of the seal collar.

FIG. 2 shows an annular stiffener 5 provided with tongues 5a having openings, for locking the stiffener in position inside the collar 2 with the help of bands 6a.

Figure 3:
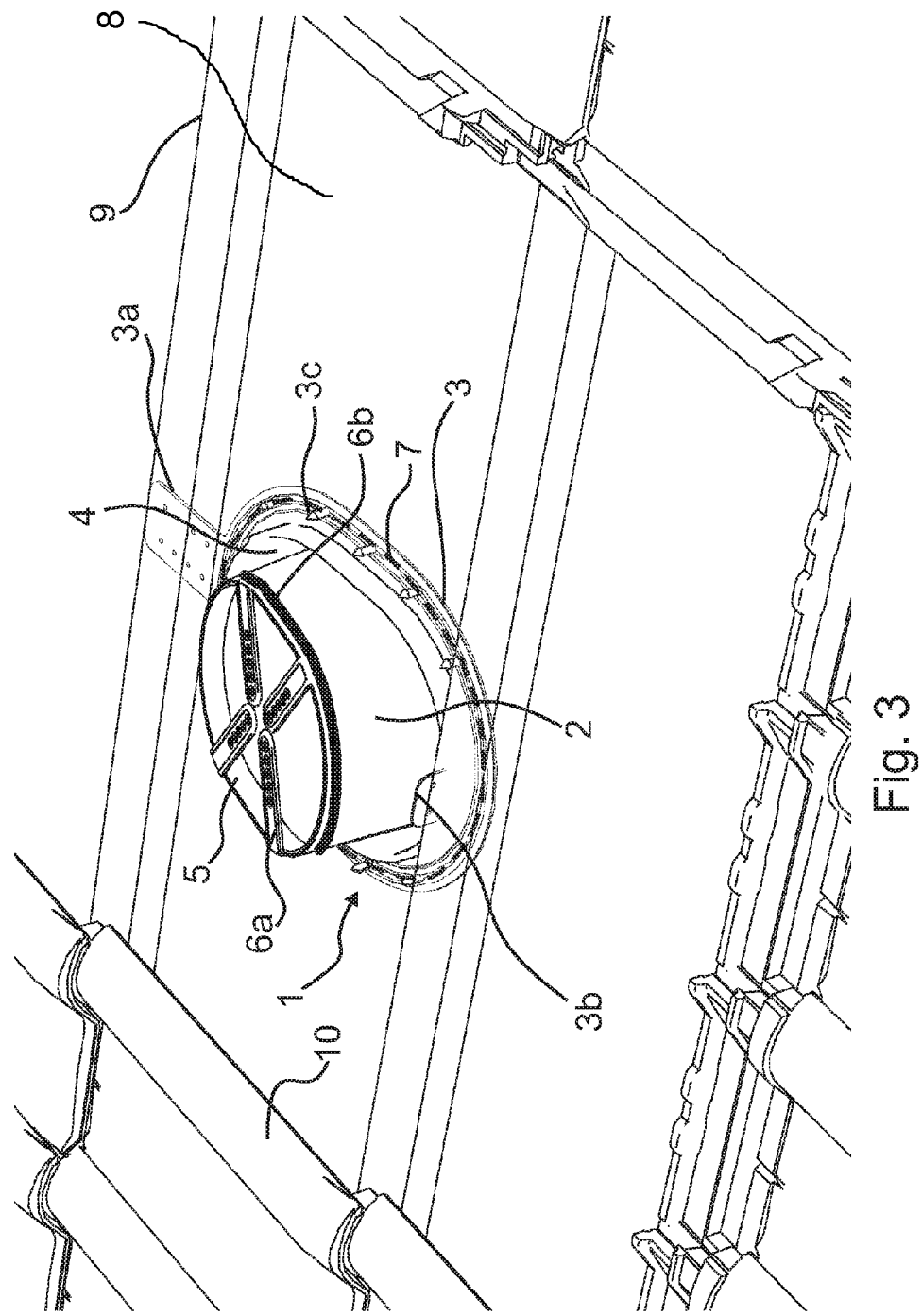
FIG. 3 shows an example of an embodiment of an underlay seal according to the invention attached to the underlay.

FIG. 3 shows the underlay seal according to FIG. 1B fitted in such a manner that the flange portion 3 remains below underlay 8 while prongs 3c penetrate the underlay 8. The dashed line identified by reference numeral 7 represents a sealing compound securing the tightness between underlay 8 and the seal. Additionally, underlay seal 1 is fastened to roof battens 9 with fastening plates 3a, 3b. In the situation of FIG. 3, the weatherproofing roof covering 10 has not yet been fitted in the area of seal 1.

Figure 4:
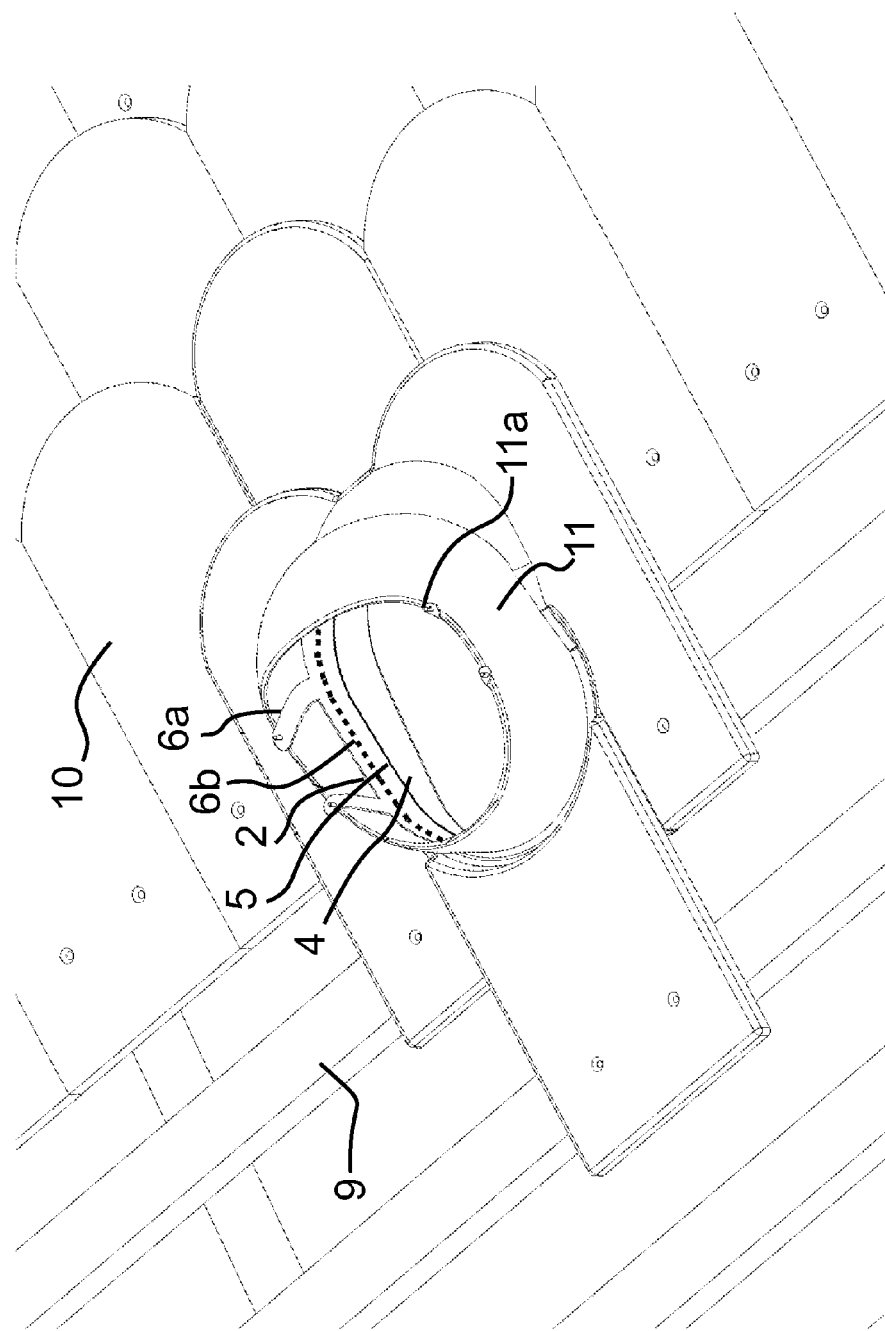
FIG. 4 shows an example of an embodiment of an underlay seal according to the invention fitted in place and attached to the roof covering penetration flashing.

In FIG. 4, underlay seal 1 is shown fitted into place. The upper end of collar 2 is attached to the inner surface of penetration flashing 11 attached to roof covering 10, both using sealing compound 6b and by pulling the upper end of collar 2 against the inner surface of penetration flashing 11 using bands 6a which are attached to pegs 11a extending from penetration flashing 11.

The underlay seal 1 according to an embodiment of the invention comprises a tubular collar 2, preferably made from a flexible material, e.g. rubber. Collar 2 is surrounded by a laterally extending flange portion 3 which for its part is made from a material stiffer than that of collar 2, e.g. plastic. Between collar 2 and the flange portion extends a flexible sleeve 4. Most preferably, sleeve 4 is made of rubber, as is collar 2. As flange part 3 is attached to underlay 8 an/or to one or more battens 9, the flexible sleeve 4 makes it possible to fit the upper end of collar 2 at a desired distance from the flange portion 3. This is necessary for sealing the upper end of collar 2 to the penetration flashing 11 since, among others, the roof pitch, the roof covering material, the penetration flashing used and the batten thickness all have an impact on the distance between underlay 8 and penetration flashing 11.

Collar 2 is most preferably adapted to loosely envelop a pipe extending through the roof structure. This facilitates easier fitting and the isolation of the pipe also in the area of seal 1. Additionally, the collar 2 is preferably oval in shape, whereby it sets better around the circular pipe, inclined according to the pitch of the roof. Also the flange portion 3 can be oval, whereby fitting the seal 1 from above is possible when an opening approximately in the shape of collar 2 is made in the underlay and/or the roof covering and the seal 1 is fitted through this opening, twisted relative to its normal position.

Underlay seal 1 can comprise one or several fastening plates 3a, 3b, adapted for fastening seal 1 to one or more battens 9. Preferably, one or more fastening plate 3a, 3b is so arranged that when fastened to one or more batten 9, they support seal 1 in such a manner that its flange portion 3 sets into a position slightly above the level of the surrounding underlay. The fastening plates 3a, 3b can, for example, be oriented parallel to or essentially perpendicularly to the flange portion 3.

Sleeve 4 can be designed in a number of ways. According to one embodiment of the invention, sleeve 4 is designed having undulating folds 4a. When the seal 1 is in an unstretched state, the folds 4a extend in essentially the direction of the flange portion. When the upper end of collar 2 is stretched further away from flange portion 3, the undulating folds of sleeve 4 are straightened and thus allow the movement of the upper end of collar 2 against penetration flashing 11. The design having a sleeve 4 with undulating folds 4a is particularly suited for an underlay seal 1 which is to be attached above underlay 8. In this case the attachment to underlay 8 can be carried out by providing, for example, self-adhesive material on the undersurface of flange portion 3, for example appropriate two-sided tape. The tightness between flange portion 3 and underlay 8 can be ensured by taping the interface between flange portion 3 and underlay 8 from above using appropriate tape.

According to another embodiment of the invention, sleeve 4 is designed as at least one fold extending between flange portion 3 and collar 2. Preferably, sleeve 4 is designed as at least one fold extending between the flange portion 3 and the lower end of collar 2. The advantage in designing sleeve 4 in the shape of at least one fold is that the flange portion 3 need not necessarily be located in the same plane as the lower end of collar 2, but flange portion 3 can be located between the upper and lower ends of collar 2. In particular in comparison to a sleeve 4 as designed with undulating folds 4a, a sleeve 4 designed as at least one fold extending between flange portion 3 and collar 2, a relatively smaller cross-section for seal 1 in the plane of flange portion 3 is obtained. This facilitates the mounting from above in a situation where flange part 3 is fitted below underlay 8.

Independently of the design of sleeve 4, the upper end of collar 2 can be provided with a surrounding stiffener 5. Stiffener 5 is preferably annular, most preferably of a shape corresponding to the upper end of collar 2. Stiffener 5 should be formed of a material harder than that of collar 2, for example plastic. The task of stiffener 5 is to ensure that the upper end of collar 2 retains its shape when it is fitted against penetration flashing 11. This enhances the tightness of the connection between the upper end of collar 2 and the penetration flashing, in particular in a situation where collar 2 is made from the same flexible material as sleeve 2, e.g. rubber. Stiffener 5 can be located internally or externally to the upper end of collar 2. Stiffener 5 can for example be molded to collar 2. Alternatively, stiffener 5 may be a separate part. When stiffener 5 is a separate part, it is preferably provided with holes or perforated tongues which are adapted for receiving through them flexible bands extending from the collar upper end, for the purpose of locking the stiffener into place.

The upper end of the collar 2 can be attached to the roof covering penetration flashing 11 for example using a sealing compound 6b. Preferably, the sealing compound is applied into the upper end of collar 2 as the seal 1 is manufactured, and it is protected by a detachable strip. Thus, the upper end of collar 2 can be attached to penetration flashing 11 simply by detaching the protective strip for the sealing compound 6b and moving the upper end of collar 2 into contact with penetration flashing 11. As the sealing compound 6b can be used, for example, double sided butyl rubber adhesive tape. Alternatively, the attachment of the collar 2 upper end to penetration flashing 11 can be dealt with during assembly, by applying an adhesive sealing compound.

Collar 2 can also be provided with flexible bands 6a extending from its upper end, for attaching the collar upper end to the roof covering penetration flashing. The ends of the flexible bands are preferably provided with openings for fastening bands 6a to prongs on penetration flashing 11, in order to pull the collar 2 upper end into contact with penetration flashing 11. When the seal 1 is provided with both flexible bands 6a and a separate stiffener 5, the stiffener can also be provided with holes or tongues having openings, through which bands 6a can be threaded for fixing stiffener 5 into place.

Preferably, the upper end of collar 2 is attached to the inner surface of penetration flashing 11, but also other arrangements are possible. The upper end of collar 2 can, for example, be adapted for being brought through the opening in penetration flashing 11 and folded against the outer surface of penetration flashing 11.

The invention claimed is:

1. A seal (1) for a roof underlay, said seal (1) comprising:
a collar (2);
a flange portion (3) laterally extending from the collar and surrounding said collar; and
a flexible sleeve (4) connecting said collar (2) to the flange portion (3), the flexible sleeve (4) extending between the collar (2) and the flange portion (3) for setting an upper end of said collar (2) flexibly at a desired distance from said flange portion (3),
wherein, one of the group consisting of i) an underside of the flange and ii) an upper surface of the flange is sealable to the underlay such that with the seal disposed under a penetration flashing (11), the seal is sealingly attached to the roof underlay between the roof underlay and the flashing.

2. The seal (1) according to claim 1, in which said sleeve (4) extends in essentially the direction of said flange portion (3) as undulating folds (4a).

3. The seal (1) according to claim 2, the seal being provided with a stiffener (5) in the area of the upper end of the collar (2).

4. The seal (1) according to claim 2, the seal being provided with self-adhesive sealing compound (6b) in the area of the upper end of the collar (2) for attaching the upper end of said collar (2) to the penetration flashing (11) for a roof covering.

5. The seal (1) according to claim 2, the seal being provided with flexible bands (6a) extending from the upper end of said collar (2), for attaching the upper end of said collar (2) to the penetration flashing (11) for a roof covering.

6. The seal (1) according to claim 1, in which said flange portion (3) surrounds a tubular collar (2) between the upper and lower ends of said collar, said sleeve (4) extending between the collar (2) and the flange portion (3) as at least one fold.

7. The seal (1) according to claim 6, the seal being provided with a stiffener (5) in the area of the upper end of the collar (2).

8. The seal (1) according to claim 6, the seal being provided with self-adhesive sealing compound (6b) in the area of the upper end of the collar (2) for attaching the upper end of said collar (2) to the penetration flashing (11) for a roof covering.

9. The seal (1) according to claim 6, the seal being provided with flexible bands (6a) extending from the upper end of said collar (2), for attaching the upper end of said collar (2) to a penetration flashing (11) for a roof covering.

10. The seal (1) according to claim 1, the seal being provided with a stiffener (5) in the area of the upper end of the collar (2).

11. The seal (1) according to claim 10, in which the stiffener (5) is molded permanently to the collar (2).

12. The seal (1) according to claim 1, the seal being provided with self-adhesive sealing compound (6b) in the area of the upper end of the collar (2) for attaching the upper end of said collar (2) to the penetration flashing (11) for a roof covering.

13. The seal (1) according to claim 12, in which the stiffener (5) is molded permanently to the collar (2).

14. The seal (1) according to claim 1, the seal being provided with flexible bands (6a) extending from the upper end of said collar (2), for attaching the upper end of said collar (2) to the penetration flashing (11) for a roof covering.

15. The seal (1) according to claim 14, in which the stiffener (5) is a separate part which is further provided with openings or perforated tongues (5a) which are adapted for flexible bands (6a) extending from the collar (2) upper end being threaded through said tongues for locking the stiffener (5) into place.

16. The seal (1) according to claim 14, in which the stiffener (5) is molded permanently to the collar (2).

17. The seal (1) according to claim 1, wherein the underside of the flange is sealable to the underlay such that with the seal disposed under the penetration flashing, the seal is sealingly attached to the roof underlay between the roof underlay and the flashing.

18. The seal (1) according to claim 1, wherein the upper surface of the flange is sealable to the underlay such that with the seal disposed under the penetration flashing, the seal is sealingly attached to the roof underlay between the roof underlay and the flashing.

19. A seal (1) for a roof underlay, said seal (1) comprising:
a collar (2);
a flange portion (3) laterally extending from the collar and surrounding the collar; and
a flexible sleeve (4) connecting said collar (2) to the flange portion (3), the flexible sleeve (4) extending between the collar (2) and the flange portion (3) for setting an upper end of said collar (2) flexibly at a desired distance from said flange portion (3),
said sleeve (4) extending in essentially a direction of said flange portion (3) as undulating folds (4a).

20. A seal (1) for a roof underlay, said seal (1) comprising:
a collar (2);
a flange portion (3) laterally extending from the collar and surrounding the collar;
a flexible sleeve (4) connecting said collar (2) to the flange portion (3), the flexible sleeve (4) extending between the collar (2) and the flange portion (3) for setting an upper end of said collar (2) flexibly at a desired distance from said flange portion (3); and
flexible bands (6a) extending from the upper end of said collar (2), the flexible bands (6a) for attaching the upper end of said collar (2) to a penetration flashing (11) for a roof covering.

* * * * *